United States Patent [19]

Hopkins et al.

[11] Patent Number: 4,961,141
[45] Date of Patent: Oct. 2, 1990

[54] GENERATING EFFICIENT CODE FOR A COMPUTER WITH DISSIMILAR REGISTER SPACES

[75] Inventors: Martin E. Hopkins, Chappaqua; Henry S. Warren, Jr., Ossining, both of N.Y.

[73] Assignee: International Business Machines Corporation, Armonk, N.Y.

[21] Appl. No.: 285,459

[22] Filed: Dec. 16, 1988

[51] Int. Cl.$^5$ .............................................. G06F 9/45
[52] U.S. Cl. .................................. 364/200; 364/280; 364/280.4; 364/280.5
[58] Field of Search ........................ 364/200, 300, 900

[56] References Cited

U.S. PATENT DOCUMENTS 4,571,678  2/1986  Chaitin ................................. 364/300

Primary Examiner—Raulfe B. Zache
Attorney, Agent, or Firm—Whitham & Marhoefer

[57] ABSTRACT

A compiler generates compiled object code from source code of a computer program in a manner that produces efficient object code for a computer with dissimilar register spaces. The technique comprising the steps of (1) generating code that references symbolic registers in which the register class is not distinguished, (2) making entries in a table denoting the context in which each symbolic register occurs and constructing an equivalence tree of symbolic registers for move instructions assigned to a same equivalence class, (3) for each equivalence class, forming the logical OR function of register usage information for all symbolic registers in the class, and for each symbolic register that appears in more than one register space context, generating new symbolic register numbers so that there is one number for each register space, and storing the numbers in said table, and (4) if a definition point of a symbolic register is encountered and that symbolic register is used in more than one register space context, inserting code in said program to either do the same operation as is done at the definition point in each register space or move a value in the symbolic register from one space to another. The improvement achieved is in object code space and time of execution.

11 Claims, 6 Drawing Sheets

PASS 1

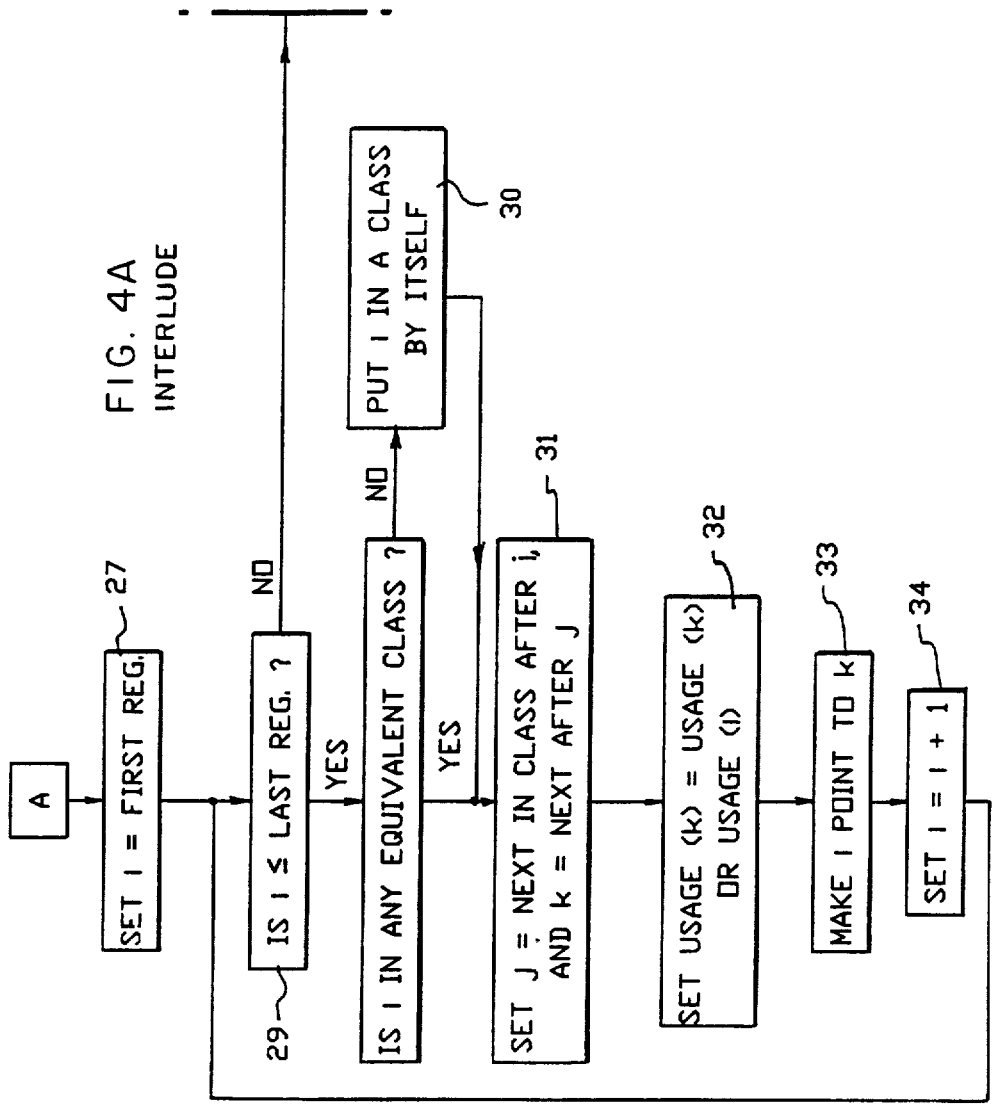

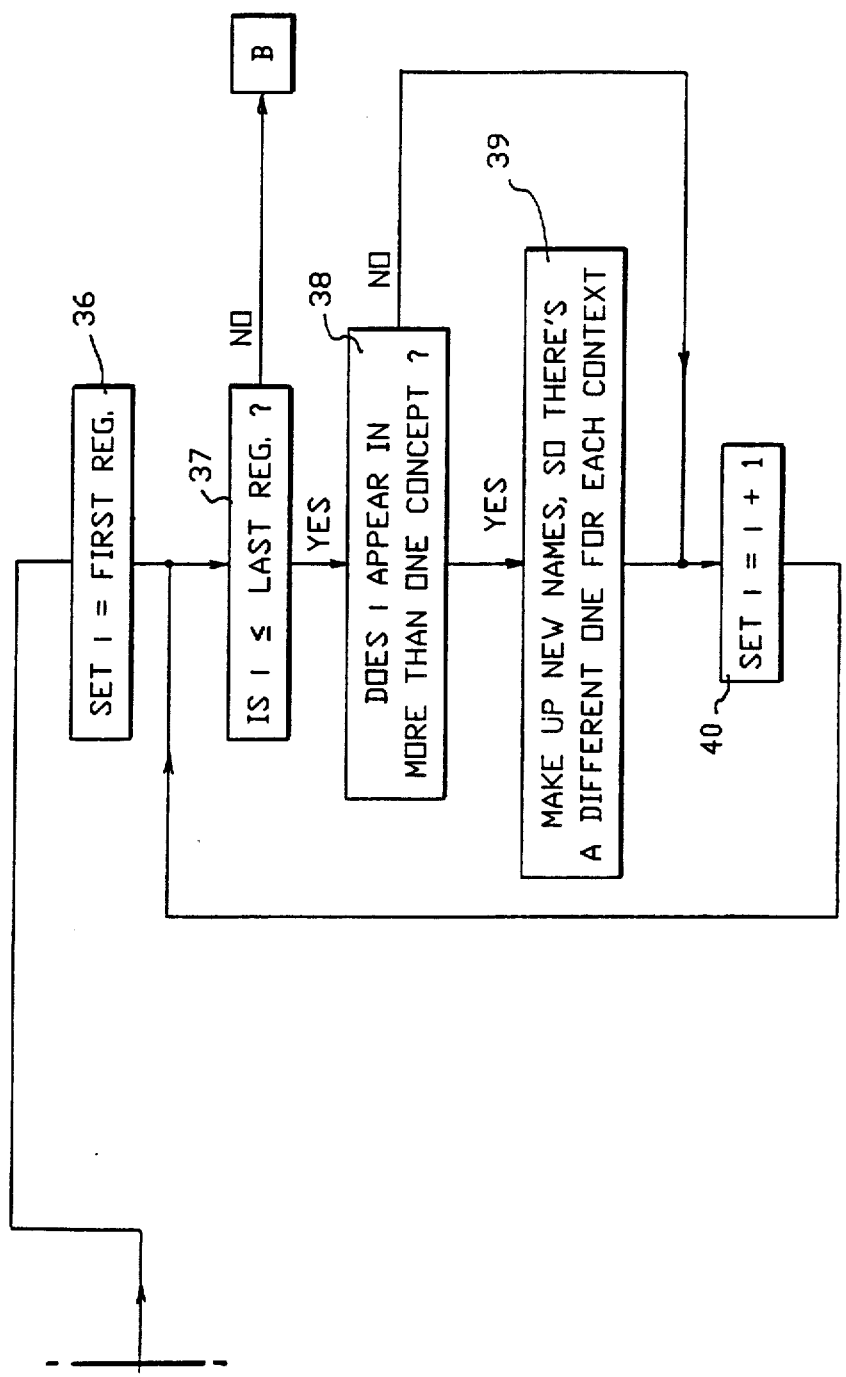

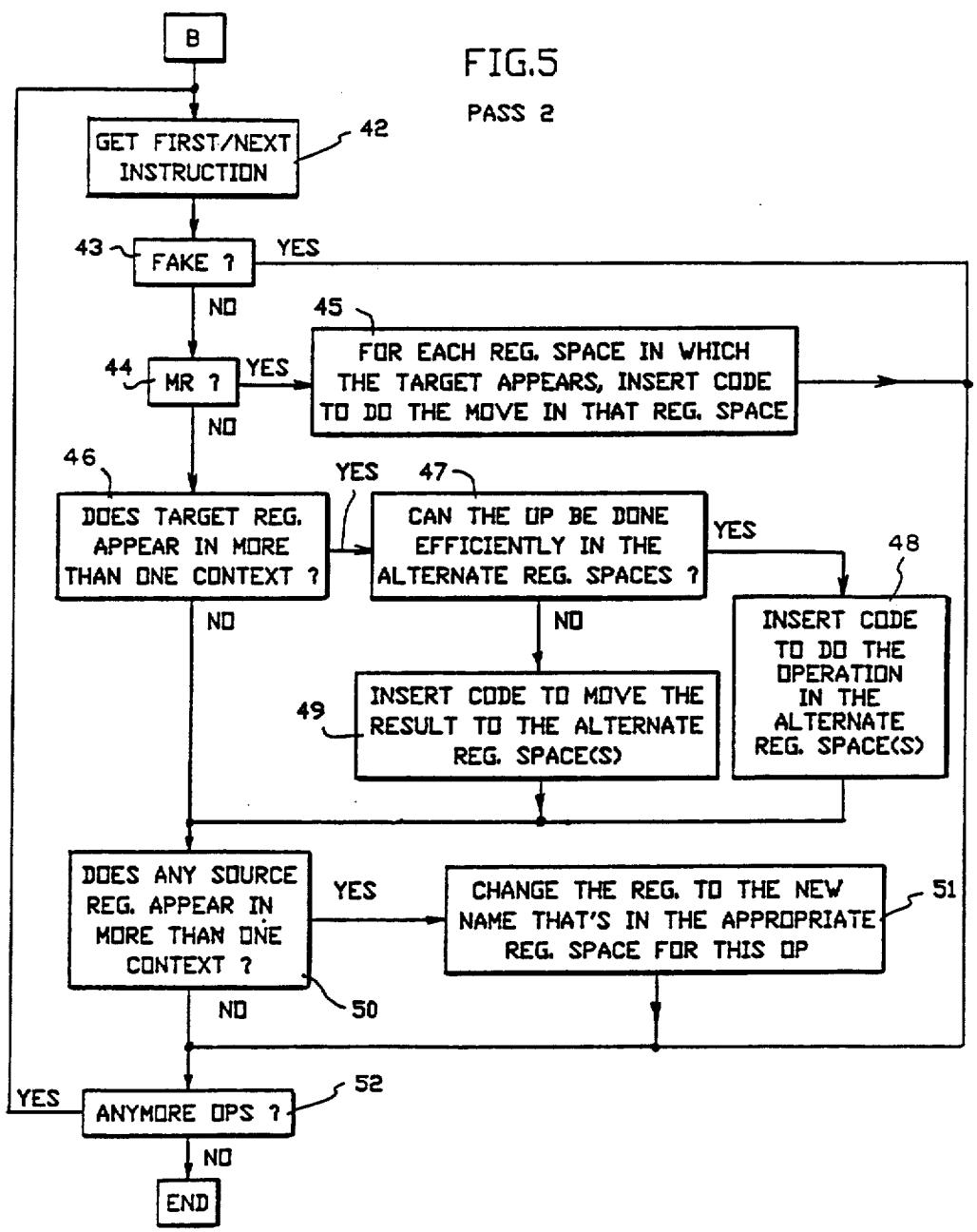

GENERATING EFFICIENT CODE FOR A COMPUTER WITH DISSIMILAR REGISTER SPACES

BACKGROUND OF THE INVENTION

1. Field of the Invention

This invention generally relates to computer compilers and, more particularly, to a method that permits an optimizing compiler to generate more efficient code for computers that have dissimilar register spaces. The invention has specific application to optimizing compilers for reduced instruction set computers (RISC) but could be used with advantage in any compiler.

2. Description of the Prior Art

There currently exists a need for a technique that may be used to improve the quality of the object code produced by a compiler. The technique should apply to a machine that has multiple register spaces, with the properties that some operations can only be done in one of the spaces, some can be done in either, and it is time-consuming to move data from one space to another. Examples of register spaces are general purpose registers (GPRs), floating point registers (FPRs) and condition registers (CRs). As an example of a time-consuming move, on the IBM Systems 370 (S/370) series of computers, and in many other computers, the only way to move data between a GPR and an FPR is to go through storage; i.e., to execute a Store Float followed by a Load or a Store followed by a Load Float.

SUMMARY OF THE INVENTION

It is therefore an object of this invention to provide a technique for improving the quality of the object code produced by a compiler.

It is another object of the invention to provide an improvement in both the object code space and time to execute the code.

It is a further object of the invention to provide a technique for generating efficient code for a computer with dissimilar register spaces.

According to the invention, a compiler generates compiled object code from source code of a computer program in a manner that produces efficient object code for a computer with dissimilar register spaces. The technique comprising the steps of (1) generating code that references symbolic registers in which the register class is not distinguished, (2) making entries in a table denoting the context in which each symbolic register occurs and constructing an equivalence tree of symbolic registers for "move" instructions assigned to a same equivalence class, (3) for each equivalence class, forming the logical OR function of register usage information for all symbolic registers in the class, and for each symbolic register that appears in more than one register space context, generating new symbolic register numbers so that there is one number for each register space, and storing the numbers in said table, and (4) if a definition point of a symbolic register is encountered and that symbolic register is used in more than one register space context, inserting code in said program to either do the same operation as is done at the definition point in each register space or move a value in the symbolic register from one space to another. The improvement achieved is in object code space and time of execution.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 4 is a detailed flow diagram of the interlude logic shown in FIG. 2; and

FIG. 5 is a detailed flow diagram of the pass 2 logic shown in FIG. 2.

DETAILED DESCRIPTION OF A PREFERRED EMBODIMENT OF THE INVENTION

Figure 1:
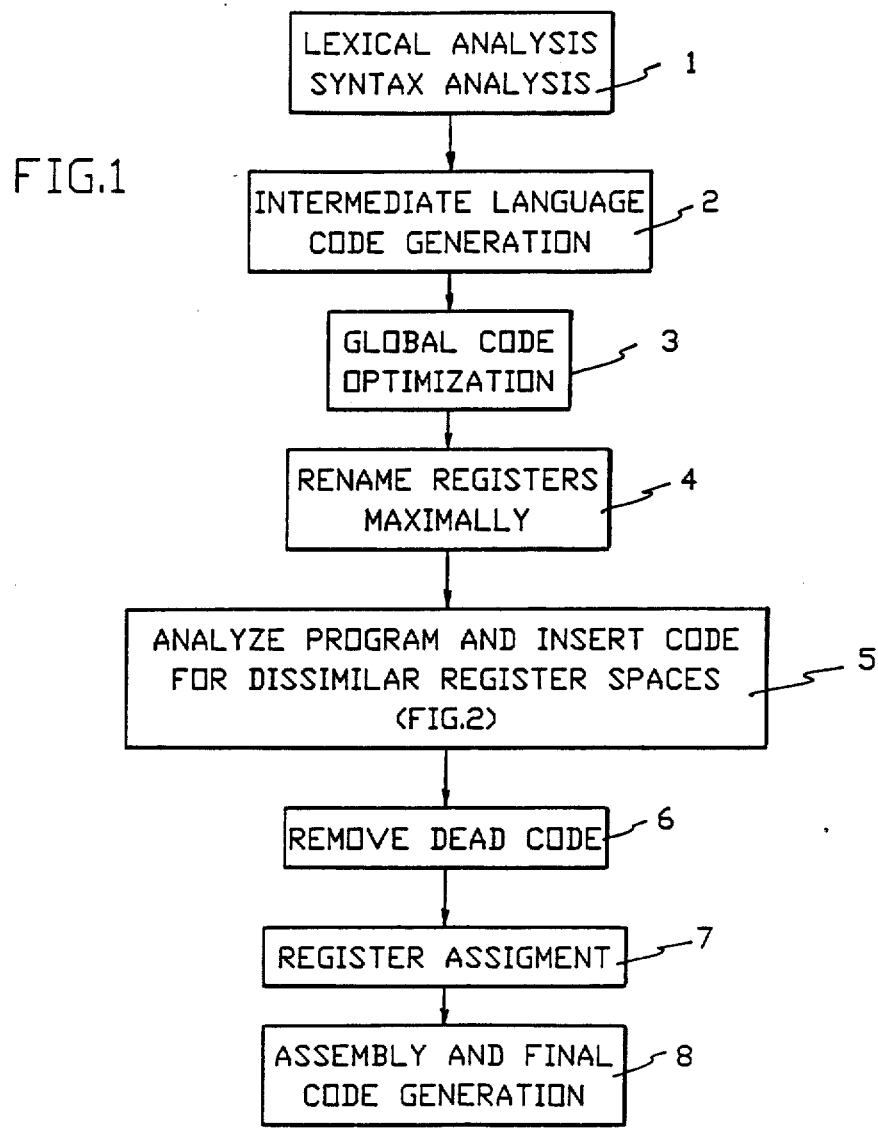
FIG. 1 is a flow diagram showing the overall structure of a typical optimizing compiler illustrating where the present invention fits into this structure.

Referring now to the drawings, and more particularly to FIG. 1, there is shown a high level flow diagram of an optimizing compiler. As is typical of such compilers, the process begins at block 1 with a lexical analysis and syntax analysis of the source code being compiled. Next, in block 2, an intermediate language code is generated, and this is followed in block 3 by a global code optimization. The process described thus far is conventional and well understood by those skilled in the design of compilers.

The improvement according to the present invention begins with block 4 where the registers are renamed maximally. Next, the program is analyzed in block 5 and code is inserted for dissimilar register spaces. This process is illustrated in more detail in FIG. 2 to which reference is now made. In block 11, a pass is made over the program to collect register usage and equivalence class information. This information is then processed in block 12 by forming the logical OR of the register usage information for all the registers in each equivalence class. Once this is done, a second pass over the program is made in block 13. In this pass, code is inserted in the program for the multiple register spaces. Thus, from FIG. 2, it will be appreciated that two passes are made over the program, but that the second pass is separated from the first by an interlude for processing the register usage and equivalence class information gathered in the first pass.

Figure 2:
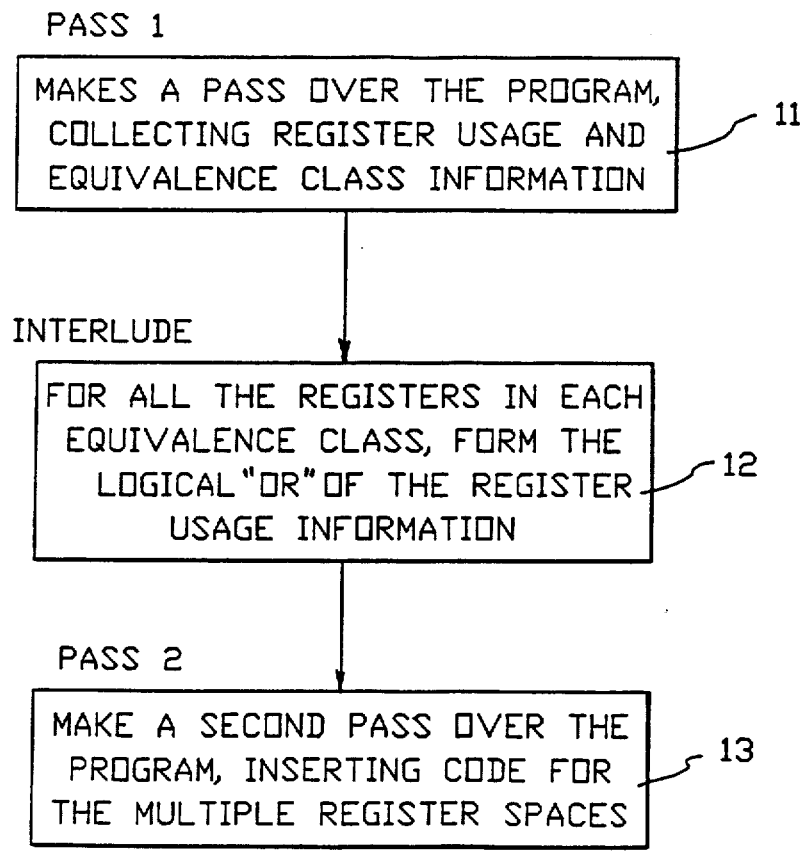
FIG. 2 is a flow diagram illustrating the logic of the present invention.

Returning now to FIG. 1 of the drawings, when the processing of FIG. 2 is completed, dead code in the program is removed in block 6. This is desirable because the steps of FIG. 2, block 13, may have inserted some unnecessary (i.e., "dead") code, and a simple way to detect and remove it is to perform the well-known optimization of dead code removal at this point. Register assignments are made in block 7 on the basis of the code as it exists to that point. Finally, the assembly and final code generation is performed in block 8 to complete the process.

Further elaborating, the technique according to the invention is embodied in the following steps:

1. First, code is generated that references symbolic registers, in which the register class is not distinguished. That is, a symbolic register such as R100 might later become assigned to a GPR, to an FPR or to a CR, depending on how it is used. This is generally illustrated at block 2 in FIG. 1. The usual optimizations such as code motion and commoning are done on this code, in block 3. The code at this point should have distinct symbolic register numbers whenever possible (a concept called the "maximal number of names"), so that step (4) below will only insert extra instructions when there is a high probability that they are necessary. This is an observation affecting only compile time, not object code quality.

2. Next, as illustrated in block 11 in FIG. 2, a pass is made over the program, noting (in a table) the context in which each symbolic register (SR) appears. This is a simple linear pass, ignoring the branching structure and the definition-use relation. During this pass, move register (MR) instructions are treated specially. The instruction "MR rx,ry" does not denote any particular register space for rx or ry, but it does mean that they are in the same spaces. To handle this, when "MR rx,ry" is encountered, we put rx and ry in the same equivalence class. Any standard algorithm for defining equivalence classes of the entries in a table may be used, for example Algorithm E of Knuth, *The Art of Computer Programming, Fundamental Algorithms*, Vol. 1, section 2.3.3 on page 354. This simple algorithm constructs a tree for each equivalence class, by putting a pointer from rx to ry in the table.

3. Next, the processing of block 12 in FIG. 2 is made by a pass over the table. For each equivalence class, the logical OR of the register usage information for all SRs in the class is formed. Then, for each SR that appears in more than one register space context, we generate new SR numbers, so that there is one for each register space. These new SR numbers are saved in the table.

4. Next, the second linear pass shown in block 13 in FIG. 2 is made over the program in which "fix up" code is inserted. If a definition point of an SR is encountered, and that SR is used (anywhere in the program) in more than one register space context, then code is inserted to either (a) do the same operation as is done at the definition point, in each register space, or (b) move the value from one space to another. During this second pass, if a "use" point of an SR is encountered, and that SR appears in more than one context, then the SR of the use is changed to be the appropriate SR number for the context of the use.

5. Lastly, the standard optimization of "dead code elimination" is done as shown in block 6 of FIG. 1, and then register allocation, as shown in block 7 in FIG. 1. Register allocation is run separately on each register space.

Steps 2 to 4 above form this invention, whereas steps 1 and 5 are a common part of an optimizing compiler. The "fix up" code could be inserted either at definition points or at use points. Inserting it at definition points (as described above) is usually best, because often one definition point feeds several uses, and because sometimes the definition is a simple one, such as setting a variable equal to a constant, that can be done in any of the register spaces (avoiding a "move" from one space to another).

Figure 3:
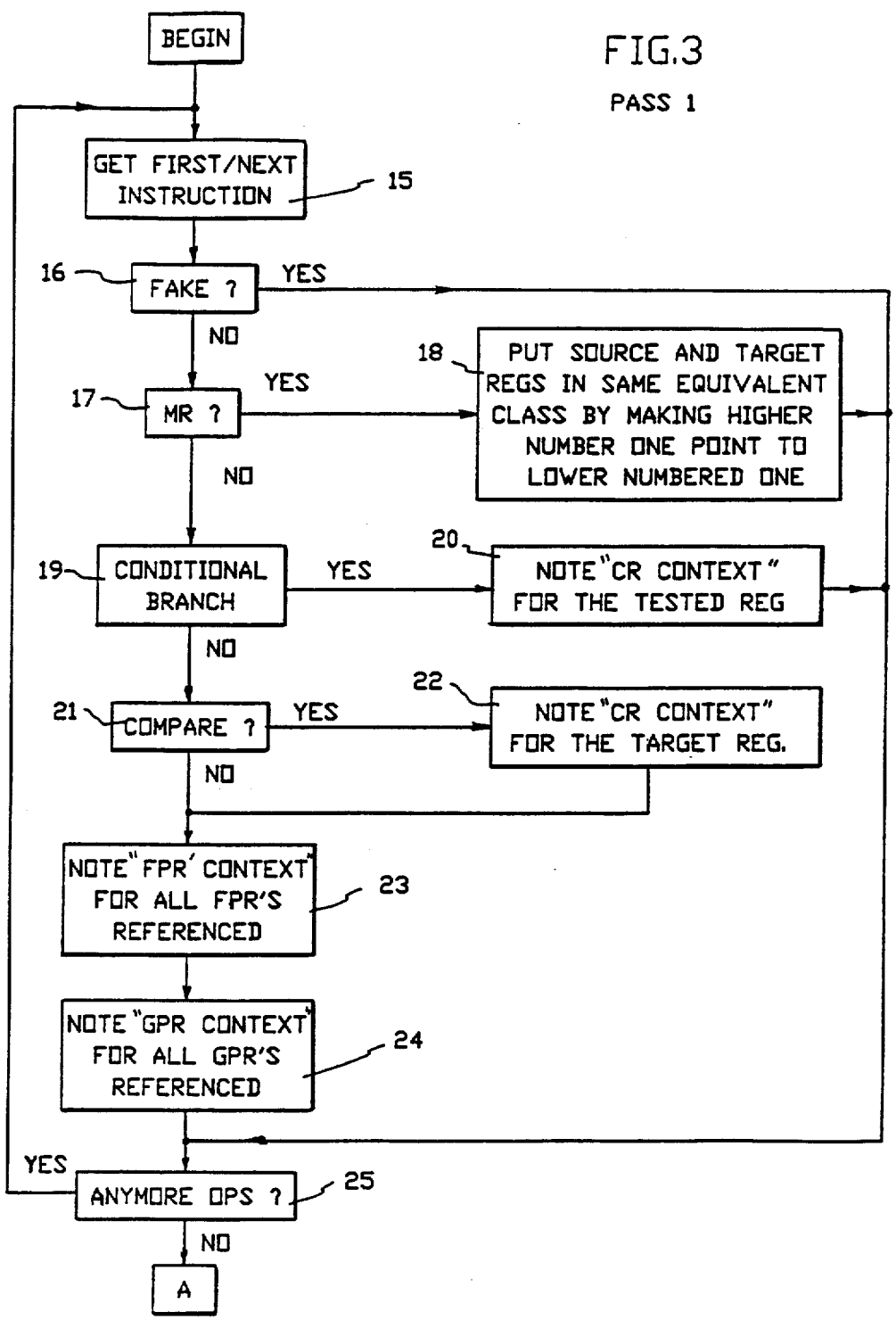
FIG. 3 is a detailed flow diagram of the pass 1 logic shown in FIG. 2.

The logic of pass 1, represented by block 11 in FIG. 2, is shown in more detail in FIG. 3, to which reference is now made. The process begins by retrieving the first or next instruction in function block 15. A test is made in decision block 16 to determine if the instruction is fake. If it is, the process jumps to decision block 25; otherwise, a test is made in decision block 17 to determine if the instruction is a move register (MR) instruction. If it is, the source and target registers are put in the same equivalence class by making the higher numbered one point to the lower numbered one in function block 18. The process then jumps to decision block 25. If, on the other hand, the test in decision block 17 is negative, a test is made in decision block 19 to determine if the instruction is a conditional branch instruction. If it is, the "CR context" for the tested register is noted in function block 20, and then the process jumps to decision block 25. If the instruction is not a conditional branch instruction, a test is made in decision block 21 to determine if the instruction is a compare instruction. If so, the "CR context" for the target register is noted in function block 22. In either case, the "FPR context" is noted for all FPRs referenced in function block 23. Next, the "GPR context" is noted for all GPRs referenced in function block 24. Finally, in decision block 25 a test is made to determine if there are any more operations to be processed. If there are, the process loops back to function block 15; otherwise, control passes to the interlude logic, shown in FIG. 4.

In FIG. 4, the interlude process begins by initializing in function block 27; that is, i is set equal to the first register. Then a test is made in decision block 28 to determine if i is less than or equal to the last register. If it is, a second test is made in decision block 29 to determine if i is in any equivalence class. If not, i is put in a class by itself in function block 30. In either case, j is set equal to the next in class after i, and k is set equal to next in class after j in function block 31. In function block 32, the usage of k is set equal to the logical OR of the usage of k and the usage of i, and in function block 33, i is made to point to k. Then, in function block 34, i is indexed by adding one to i before looping back to decision block 28.

When the result of the test in decision block 28 is negative, the process goes to function block 36 where, again, i is set equal to the first register. A test is made in decision block 37 to determine if i is less than or equal to the last register. If so, a further test is made in decision block 38 to determine if i appears in more than one context. If so, new names are made up in function block 39 so that there is a different name for each context. In either case, i is then indexed in function block 40 by adding one to i. The process ends when the result of the test in decision block 37 is negative, at which point control passes to the logic of pass 2 shown in FIG. 5.

Processing for pass 2 begins by retrieving the first or next instruction in function block 42. A test is made in decision block 43 to determine if the instruction is fake. If so, the process jumps to decision block 52; otherwise, a test is made in decision block 44 to determine if the instruction is a move register (MR) instruction. If it is, in function block 45 code is inserted for each register space in which the target appears to do the "move" instruction, and then the process jumps to decision block 52. If not a move register instruction, a test is made in decision block 46 to determine if the target register appears in more than one context. If so, a further test is made in decision block 47 to determine if the operation can be done efficiently in the alternate register spaces. If so, code is inserted to do the operation in the alternate register spaces in function block 48. If not, code is inserted to move the result to the alternate register spaces in function block 49. In either case or if the result of the test in decision block 46 is negative, control goes to decision block 50 where a test is made to determine if any source register appears in more than one context. If so, the register name is changed to the new name that is in the appropriate register space for the operation in function block 51. In either case, control next goes to decision block 52 where a test is made to determine if there are any more operations to be processed. If so, the process loops back to function block 42; otherwise, the process ends.

As an example of these transformations, assume that the computer has multiple general registers and multiple condition registers. Assume for simplicity that the condition registers are the same length (e.g., 32 bits) as the general registers. This invention is applicable to the case in which the registers are of different lengths; the details are more complicated, but the principles are the same. Then some typical transformations are shown below. Here, "rx" in the left column denotes the original symbolic register. We assume that "rx" appears in both contexts (general register and condition register) somewhere in the program. In the right column, "crx" denotes the condition register counterpart of "rx". That is, when registers are assigned to the code in the right column, "rx" will be assigned to a GPR, and CRX will be assigned to a condition register.

| L   | rx, ...  | L    | rx, ...    | (1) |
|-----|----------|------|------------|-----|
|     |          | MTCR | crx,rx     |     |
| LI  | rx,imm   | LI   | rx,imm     | (2) |
|     |          | LICR | crx,imm    |     |
| MR  | rx,ry    | MR   | rx,ry      | (3) |
|     |          | MCR  | crx,cry    |     |
| CMP | rx, ...  | CMP  | crx, ...   | (4) |
| BGT | rx,label | BGT  | crx,label  | (5) |

(1) shows a fixed point load instruction. Since rx appears somewhere in both contexts (we are assuming), we generate a new symbolic register crx and insert a "move to condition register" instruction to move rx to crx. MTCR is a slow, undesirable instruction, but we are assuming that there is no way to load directly from memory to a CR, so we had to use it.

(2) shows a Load Immediate instruction. We assume the computer has a fast Load Immediate into a CR (LICR), so we use that to set crx, rather than an MTCR.

(3) shows a Move Register instruction. If either rx or ry appears in both contexts, then they both will appear in both contexts, by the equivalence class algorithm described above. Hence, both rx and ry have CR counterparts crx and cry. We insert an instruction to move cry to crx.

(4) shows a Compare instruction. We assume the target can only be a CR. Hence, we change rx to the CR counterpart crx.

(5) shows a Branch on Condition. We assume the tested register rx can only be a CR, so we change it to the CR counterpart crx.

Assume a program contains the source code shown in column (1) below, written in a high level language such as PL/I. Variable X is a logical variable (a single bit). We do not show any flow of control; the lines can be anywhere in the program. Some may be in loops and they are not necessarily in the order shown. A compiler that does not incorporate the present invention would generate code similar to that shown in column (2). It contains an MTCR (move to condition register) instruction which we assume is costly to execute. A compiler that does incorporate the present invention would generate the code similar to that shown in column (3). This code is faster because it employs LICR (load immediate CR) instructions, rather than an MTCR instruction.

| (1)         | (2)         | (3)         |
|-------------|-------------|-------------|
| X=0;        | LI R1,0     | LI R1,0     |
|             |             | LICR CR1,0  |
| X=1;        | LI R1,1     | LI R1,1     |
|             |             | LICR CR1,1  |
| IF X THEN   | MTCR CR1,R1 | BC CR1,LAB  |
| GO TO LAB;  | BC CR1,LAB  |             |
| Y=X;        | ST R1,Y     | ST R1,Y     |

If the Store into Y were not present, then the code in column (3) would simplify; that is, GPR R1 would become dead (have no uses), so the conventional optimization of dead code elimination would eliminate the two LI instructions. But the code in column (2) does not simplify in this case.

While the invention has been described in terms of a single preferred embodiment, those skilled in the art will recognize that the invention may be practiced with modification within the spirit and scope of the appended claims.

Having thus described our invention, what we claim as new and desire to secure by Letters Patent is as follows:

1. In a compiler which generates compiled object code from source code of a computer program, a computer performed method of generating efficient object code for a computer with dissimilar register spaces comprising the steps of:

generating by a computer code that references symbolic registers in which a register class is not distinguished;

making entries in a table by the computer denoting a context in which each symbolic register occurs and constructing an equivalence tree of symbolic registers for move instructions assigned to a same equivalence class;

for each equivalence class, forming by the computer a logical OR function of register usage information for all symbolic registers in the equivalence class, and for each symbolic register that appears in more than one register space context, generating by the computer new symbolic register numbers so that there is one number for each register space, and storing the new symbolic register numbers in said table; and if a definition point of a symbolic register is encountered and that symbolic register is used in more than one register space context, inserting by the computer code in said program to either do a same operation as is done at the definition point in each register space or move a value in the symbolic register from one space to another.

2. The method of generating efficient object code for a computer as recited in claim 1 wherein said step of making entries in a table further comprises the step of checking by the computer each instruction to determine if it is a move register instruction, and if so, putting source and target registers in a same equivalence class.

3. The method of generating efficient object code for a computer as recited in claim 1 wherein said step of making entries in a table further comprises the step of checking by the computer each instruction to determine if it is a conditional branch instruction, and if so, noting a conditional register context for that register.

4. The method of generating efficient object code for a computer as recited in claim 1 wherein said step of making entries in a table further comprises the step of checking by the computer each instruction to determine if it is a compare instruction, and if so, noting a conditional register context for that register.

5. The method of generating efficient object code for a computer as recited in claim 1 wherein said step of making entries in a table further comprises the steps of:
   checking by the computer each instruction to determine if it is a move register instruction, and if so, putting source and target registers in a same equivalence class;
   checking by the computer each instruction to determine if it is a conditional branch instruction, and if so, noting a conditional register context for that register; and
   checking by the computer each instruction to determine if it is a compare instruction, and if so, noting a conditional register context for that register.

6. The method of generating efficient object code for a computer as recited in claim 5 wherein the step of making entries in a table further comprises the steps of:
   noting by the computer a floating point register context for all referenced floating point registers; and
   noting by the computer a general purpose register context for all referenced general purpose registers.

7. The method of generating efficient object code for a computer as recited in claim 6 wherein the steps of forming the logical OR function and generating new symbolic register numbers further comprise the steps of:
   testing by the computer each register to determine if it is assigned to an equivalence class, and if not, putting that register in a class by itself; and
   testing by the computer each register to determine if it appears in more than one context, and if so, making up new names so that there is a different one for each context.

8. The method of generating efficient object code for a computer as recited in claim 7 wherein said step of inserting code further comprises the step of checking by the computer each instruction to determine if it is a move register instruction, and if it is, inserting by the computer code to do the move instruction in that register space.

9. The method of generating efficient object code for a computer as recited in claim 7 wherein said step of inserting code further comprises the step of checking by the computer each target register to determine if that register appears in more than one context, and if so, determining by the computer if an operation can be done efficiently in alternate register spaces, and if so, inserting by the computer code to do the operation in the alternate register spaces, but otherwise, inserting by a computer code to move the result to the alternate register spaces.

10. The method of generating efficient object code for a computer as recited in claim 7 wherein said step of inserting code further comprises the steps of testing by the computer each source register to determine if it appears in more than one context, and if so, changing by the computer an register to a new name that is in the appropriate space for a corresponding operation.

11. The method of generating efficient object code for a computer as recited in claim 7 wherein said step of inserting code further comprises the steps of:
    checking by the computer each instruction to determine if it is a move register instruction, and if it is, inserting by the computer code to do the move instruction in that register space;
    checking by the computer each target register to determine if that register appears in more than one context, and if so, determining by the computer if an operation can be done efficiently in alternate register spaces, and if so, inserting by the computer code to do the operation in the alternate register spaces, but otherwise, inserting by the computer code to move the result to the alternate register spaces; and
    testing by the computer each source register to determine if it appears in more than one context, and if so, changing by the computer the register to a new name that is in an appropriate space for a corresponding operation.

* * * * *